United States Patent
Beard

[15] 3,693,085
[45] Sept. 19, 1972

[54] SYSTEM FOR CALIBRATED HIGH LEVEL CURRENT MEASUREMENT USING A MAGNETIC FIELD RESPONSIVE TRANSISTOR

[72] Inventor: Jack H. Beard, Warren, Mich.
[73] Assignee: General Motors Corporation, Detroit, Mich.
[22] Filed: July 15, 1971
[21] Appl. No.: 162,826

[52] U.S. Cl.................324/117 H, 307/309, 324/46, 335/237
[51] Int. Cl..........................G01r 33/00, G01r 33/02
[58] Field of Search........324/127, 117 H, 117 R, 46, 324/45, 126, 115; 323/51, 94 H; 307/309; 335/236, 237

[56] References Cited

UNITED STATES PATENTS

| 2,179,305 | 11/1939 | Stickney et al. | 335/237 |
| 3,286,161 | 11/1966 | Jones et al. | 324/45 |
| 3,389,230 | 6/1968 | Hudson, Jr. | 324/46 |

Primary Examiner—Rudolph V. Rolinec
Assistant Examiner—Ernest F. Karlsen
Attorney—E. W. Christen et al.

[57] ABSTRACT

A transistor having terminal characteristics dependent on the magnetic field incident on the transistor is used in a current sensing arrangement to measure the level of current in a conductor. A differential output voltage is provided by the transistor proportionate to the magnetic field created by the current in the conductor. Calibration of the current sensor is effected by intensifying or shunting the magnetic field to permit measurement of low and high current levels respectively. The field incident on the transistor is intensified by use of magnetic material to direct the magnetic flux on the transistor to sense low current levels. High current levels are sensed by shunting the magnetic field in a calibrated fashion such that the field impinging on the transistor is maintained within the operational limits of the device; magnetic material is interposed between the transistor and the conductor to afford the requisite shunt path.

2 Claims, 5 Drawing Figures

PATENTED SEP 19 1972
3,693,085
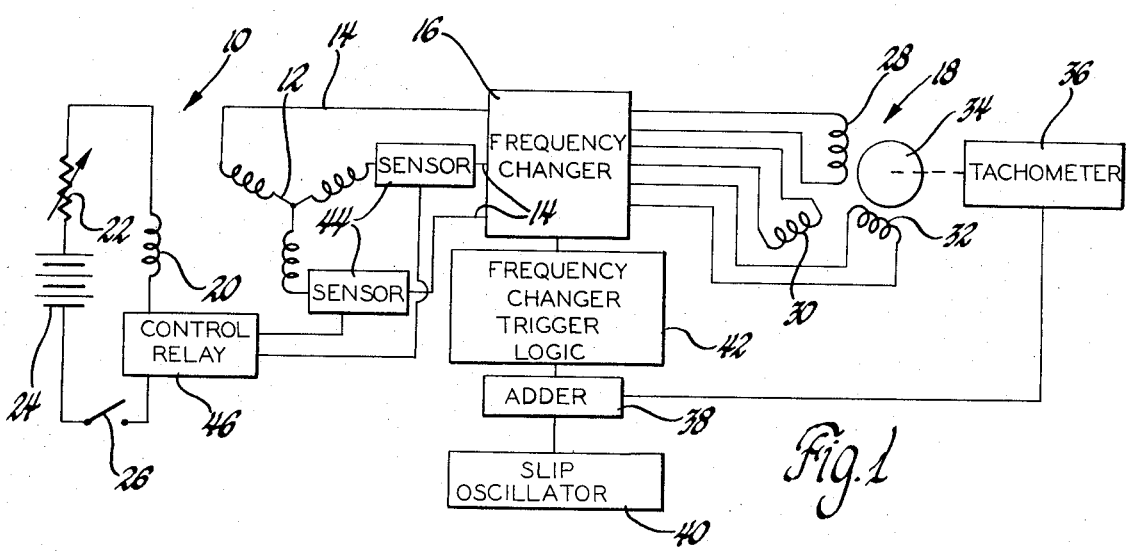
Fig.1
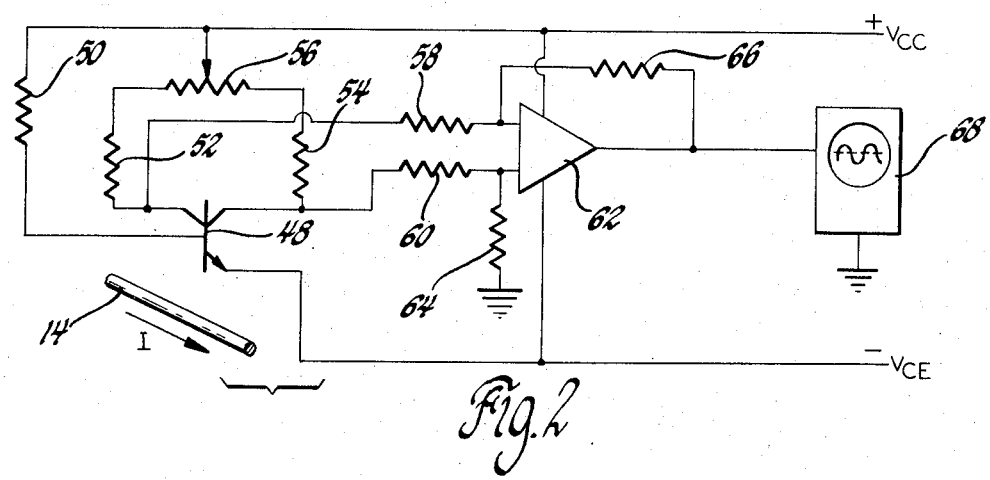
Fig.2
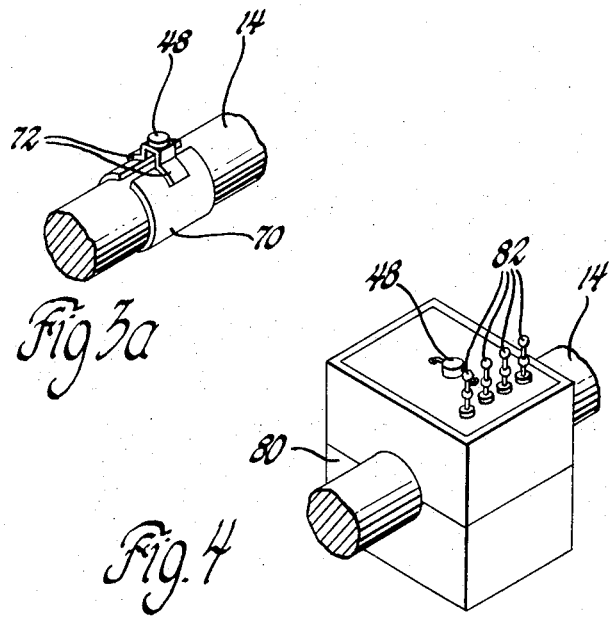
Fig.3a
Fig.4
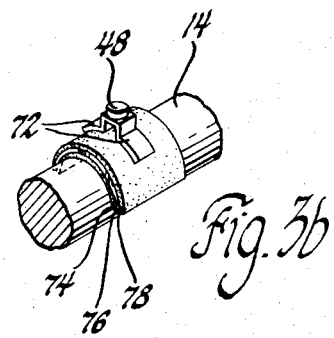
Fig.3b
INVENTOR.
Jack H. Beard
BY
C.R. Meland
ATTORNEY

SYSTEM FOR CALIBRATED HIGH LEVEL CURRENT MEASUREMENT USING A MAGNETIC FIELD RESPONSIVE TRANSISTOR

This invention relates to a means for calibrating current sensing circuits using magnetic responsive transistors and, in particular, a calibrated magnetic shunt is disclosed to adapt the current sensing circuit for use in sensing high current levels.

Semiconductor magnetic responsive devices such as the magnetic responsive transistor disclosed in U.S. Pat. No. 3,389,230 Hudson, Jr., are readily adapted to current sensing and measurement applications. The device of U.S. Pat. No. 3,389,230 includes four electrodes: an emitter, a base, and two collectors. Current from the emitter is divided between the two collectors with the proportionate share of each collector varying with the level of magnetic field incident on the transistor. When the transistor is disposed in proximity with a current carrying conductor, a differential output voltage is developed between the two collectors in proportion of the magnetic field created by the current in the conductor and incident on the transistor. Since the proportionality constant is a known characteristic of the device, an indication of the current level is provided.

Although magnetic responsive transistors are readily adapted to current sensing and measurement applications, prior uses have been limited by the requirement that the field intensity incident on the transistor be maintained within a predetermined range for proper operation. Accordingly, the use of a magnetic transistor in current sensing circuits has been restricted to systems characterized by currents on the order of 50 amps and less. The present invention uses a calibrated magnetic shield or shunt to reduce the intensity of the magnetic field incident on a magnetic responsive transistor to permit measurement of high level currents. In this manner, currents on the order of 5,000 to 10,000 amps are sensed with a magnetic responsive transistor current sensing circuit.

Electrostatic and magnetic shield arrangements are generally known in the prior art to isolate electric and magnetic fields. Thus, fields can be confined to a predetermined volume in space, or if desired, fields can be excluded from a preselected volume. Shielding arrangements of this type are intended to perform the gross function of total exclusion, and leakage is considered to be a measure of shield inadequacy.

The calibration feature of the present invention, unlike prior art shielding arrangements, provides attenuation to afford a calibrated magnetic field signal incident on the magnetic responsive transistor. This is accomplished by interposing magnetic material between the conductor and the magnetic responsive transistor to shunt circulating flux and thereby attenuate the flux level in the region beyond the magnetic material. In this manner, the flux incident on the transistor is a calibrated, attenuated version of the flux which would be incident on the transistor when located in the same relationship to the conductor, but without the intermediate magnetic material. Thus, the differential output voltage provided by the transistor is an indication of the level of current carried by the conductor.

Accordingly, it is an object of the present invention to provide means for calibrating a magnetic responsive transistor current sensing circuit for use with high level currents by interposing a magnetic shunt between the transistor and the conductor carrying the current to be sensed.

It is another object of the present invention to use magnetic material for calibrating a magnetic responsive transistor current sensing circuit by placing first a layer of insulator, then a layer of magnetic material, and finally a layer of insulator in a semi-cylindrical shell geometry to shunt magnetic flux and to control calibration by varying the circumferential extent of the calibration materials.

These and other objects and advantages of the present invention will be apparent from the following description wherein the figures listed below are incorporated as illustrative of a preferred embodiment and wherein:

FIG. 1 is a schematic diagram partially in block form of a controlled slip speed induction motor system wherein current sensors using the instant invention monitor currents to protect against adverse effects of system failures;

FIG. 2 is a circuit schematic partially in block form of a magnetic responsive transistor and the requisite amplifier circuitry typically included in a current sensing arrangement of the type used in the present invention;

FIG. 3A is an intensifier calibrating arrangement using magnetic material and a magnetic responsive transistor;

FIG. 3B is a perspective view of the shunt calibration of the instant invention; and FIG. 4 is a perspective view of a conductor and a clamp-on box including the magnetic sensing elements of the present invention in proximity to the conductor.

Reference should now be made to the drawings and in particular to FIG. 1 wherein an induction motor slip speed control system is shown including line current sensors according to the instant invention. An alternator generally designated 10 having a Y-connected output winding 12 provides three-phase voltage on lines 14 to the input of a controlled rectifier frequency changer 16 to supply the power necessary to drive an induction motor shown generally at 18. The alternator 12 has a field control circuit including a field winding 20, a field control resistor 22, and a source of excitation voltage shown as a battery 24. A switch 26 is included in the field control circuit to control the presence of excitation for the field winding 20. It should be appreciated that the field control shown and described is merely exemplary and other regulator schemes could be readily substituted.

The induction motor 18 has three windings 28, 30, and 32 and a rotor 34 connected with the motor's output load and coupled with a tachometer 36 to develop a control signal proportional to rotor speed. The tachometer 36 can take a variety of known forms providing either pulsed or DC output voltage. The tachometer speed signal is connected with an adder 38 where it is combined with a control frequency signal from a slip oscillator 40 to develop a slip frequency control for connection with the frequency changer trigger logic 42. In this manner, the frequency changer trigger logic sequentially and periodically gates controlled rectifiers in the frequency changer 16 in synchronism with the control output of adder 38 to effect slip speed control, all of which is generally known in the art. The frequency changer 16 has separate excitation connections with each of the windings 28, 30, and 32 of the AC induction motor 18, and frequency changer 16 supplies the motor windings at a frequency substantially less than the input frequency on lines 14. A typical slip speed control system including a detailed description of the logic required is disclosed in copending application Ser. No. 57,143, filed July 22, 1970, now U.S. Pat. No. 3,611,104 in the name of Jalal T. Salihi et al., and titled "Controlled Rectifier Triggering System," to which the reader is referred for details of the slip speed control.

Current levels encountered when the motor control system of the drawing is used with high horsepower induction motors can attain amplitudes on the order of thousands of amps. To ensure against destructive effects from system faults, it is desirable that the current level be sensed to develop a control signal on the occurrence of excessive current associated with system faults. In the control arrangement of the drawing of FIG. 1, the current in two of the three lines 14 is sensed by sensors 44 and the current indication is used as a control for the field excitation circuit control relay 46 to open circuit the field excitation circuit on the occurrence of a fault. In view of the order of magnitude of the currents in the lines 14, known current sensing circuits using magnetic responsive transistors such as the transistor disclosed in U.S. Pat. No. 3,389,230 Hudson, Jr., have not been suitable for use in the motor control system; the known current sensing circuits have been restricted to applications where currents do not exceed approximately 50 amps. Accordingly, the calibration shunt of the present invention is included in the sensors 44 to adapt the magnetic transistor for use in this system. The differential output voltages of the transistors are related to current levels in the lines 14 and the control relay 46 open circuits the field excitation path when either current level exceeds a preset maximum. A comparator with a reference level input can be used with each of the sensors 44 to develop a control signal for the control relay on the occurrence of a system fault. Only two of the three lines 14 need be sensed inasmuch as all current from the alternator passes through one of the two. All of the foregoing relating to the current sensing and calibration of the circuit including the magnetic responsive transistor is more fully set forth hereinafter.

In FIG. 2, an electronic circuit is shown for developing a voltage proportional to current carried by a conductor. No calibration is shown in this figure; however, it should be borne in mind that calibration affects the intensity of the field incident on the magnetic transistor, but otherwise the sensing circuit and processing electronics of FIG. 2 are the same as that used in conjunction with calibrated sensing circuits.

A conductor line 14 is disposed in proximity with a magnetic transistor 48 having a base, an emitter, and two collector electrodes. Current in the conductor 14 causes a circulating magnetic field which impinges the semiconductor material of transistor 48 affecting the operation in the manner set out in U.S. Pat. No. 3,349,230. A resistor 50 connects the base of the transistor 48 with a positive DC bias voltage $V_{CC}$. The emitter is connected directly with a negative DC bias voltage $V_{CE}$. The bias voltage $V_{CC}$ and $V_{CE}$ can take a variety of forms generally known in the art, including DC batteries. The two collectors of transistor 48 are connected respectively with load resistors 52 and 54 and through a null potentiometer 56 with the positive bias supply $V_{CC}$. This completes the electrical connections required for the transistor 48. Potentiometer 56 is adjusted such that the voltage at the two collectors of transistor 48 on resistors 52 and 54 is balanced when the magnetic field impinging on the transistor is zero.

In operation, current from the emitter is divided between the two collectors with the proportionate share of each collector varying with the magnetic field level incident on the transistor. In the absence of any magnetic field, the current divides in a proportion such that the differential voltage between the two collectors is zero. Current in conductor 14 causes a circulating flux which alters the current division proportionately. Thus, the voltage differential between the two collectors is a measure of the current in conductor 14.

To develop a signal suitable for measurement or control, the voltages on load resistors 52 and 54 are connected with an operational amplifier and the voltage difference is amplified. The voltages developed across resistors 52 and 54 respectively are connected through input resistors 58 and 60 with an operational amplifier 62. This amplifier has a bleed resistor 64 and a feedback resistor 66 to complete the connections requisite for differential amplification. Bias voltage from the sources $V_{CC}$ and $V_{CE}$ is connected with the amplifier. The output from amplifier 62 is shown connected with an oscilloscope 68 where a trace correlated with the current in conductor 14 is produced. As shown in FIG. 1 and noted above, the output signal can also be used to effect control in the circuit being monitored.

In a typical processing circuit, the following parameter values can be used in the circuit of FIG. 2. Resistor 50 is 8K; resistors 52, 54, 58, and 60 are 10K; resistor 56 is 200 ohms; and resistors 64 and 66 are 1M. Each of the sources $V_{CC}$ and $V_{CE}$ is 15 volts, providing respectively positive and negative bias. And the operational amplifier 62 is a Fairchild Semiconductor UA 741C.

FIG. 3A shows a magnetic intensifier calibrating arrangement wherein magnetic material 70 envelops the conductor 14 whose current is to be sensed. In this arrangement, the magnetic input leads 72 of the transistor 48 are placed in a region of intense magnetic field to permit low level current sensing. In this manner, flux circulating about the conductor 14 is concentrated and directed to the transistor 48 to provide an adequate amount of magnetic flux.

In FIG. 3B, the magnetic shunt of the instant invention is shown for calibrating the current sensing magnetic responsive transistor 48 for use in conjunction with the conductor 14 carrying high level current. An insulator 74 such as a phenolic material is placed adjacent the conductor 14 and magnetic material 76 such as transformer laminations is placed adjacent the insulator 74. A third layer comprising insulating material 78 such as phenolic is placed outside the magnetic material 76. The transistor 48 is positioned on the insulator 78 with its magnetic input leads 72 in contact with the insulator 78. The axial extent of the insulator-magnetic-insulator sandwich is on the order of three or four times the width of the magnetic input leads 72 of transistor 48. The sandwich or calibration shunt has a circumferential extent on the order of 180°; this circumferential angle is variable to adjust the calibration constant of the current sensor.

In the shunt or shield configuration of FIG. 3B, the magnetic field is attenuated at the location of the transistor 48 by comparison with the same transistor-conductor placement in the absence of the intermediate magnetic material 76. The field is effectively shunted by the magnetic material between the conductor and the transistor. Thus, the flux incident on the transistor is a calibrated, attenuated version of the flux which would be incident on the transistor without the intermediate magnetic material, and a measure of the current in conductor 14 is accordingly developed.

Low losses and good frequency response are realized when transformer laminations are used for the magnetic material 76, and linearity of operation is preserved when transformer laminations are used.

In FIG. 4, a clamp-on box 80, typical of that used in the present invention, is shown including output terminals 82 for connection with external circuitry. The transistor 48 and requisite calibration magnetic material is placed inside the box in proximity with the conductor 14. The four terminals 82 provide connections with the four electrodes of the transistor 48.

Although the foregoing has proceeded in terms of particular examples, it should be understood that various modifications and changes could be made within the scope of the appended claims.

I claim:

1. A system for sensing the level of current carried by an electrical conductor, comprising: a magnetic responsive transistor disposed in proximity with said electrical conductor, said transistor and said conductor disposed such that the magnetic field circulating about said conductor impinges on said transistor, said transistor being operative to provide a differential output voltage signal wherein the amplitude of the voltage differential is proportional to the intensity of the magnetic field incident on said transistor; a quantity of magnetic material interposed between said transistor and said conductor to partially shield said transistor from the magnetic field circulating about said conductor to provide a calibrated magnetic field at said transistor, said magnetic material providing a shunt path for flux circulating about said conductor such that the flux incident on said transistor is a calibrated, attenuated version of the flux which would be incident on said transistor located in the same relationship to said conductor but without the interposed magnetic material; and a calibrated processing electrical circuit to convert said differential output voltage to an indication of the current level carried by said conductor.

2. A system for sensing the level of current carried by an electrical conductor, comprising: a magnetic responsive transistor disposed in proximity with said electrical conductor, said transistor and said conductor disposed such that the magnetic field circulating about said conductor impinges on said transistor, said transistor being operative to provide a differential output voltage signal wherein the amplitude of the voltage differential is proportional to the intensity of the magnetic field incident on said transistor; a substantially semicylindrical shell of magnetic material interposed between said transistor and said conductor to partially shield said transistor from the magnetic field circulating about said conductor to provide a calibrated magnetic field at said transistor, said magnetic material providing a shunt path for flux circulating about said conductor such that the flux incident on said transistor is a calibrated, attenuated version of the flux which would be incident on said transistor located in the same relationship to said conductor but without the interposed magnetic material; and a calibrated processing electrical circuit to convert said differential output voltage to an indication of the current level carried by said conductor.

* * * * *